(12) United States Patent
Lin

(10) Patent No.: US 8,950,953 B2
(45) Date of Patent: Feb. 10, 2015

(54) OPTICAL CONNECTOR HAVING TWO PRINTED CIRCUIT BOARDS

(71) Applicant: Hon Hai Precision Industry Co., Ltd., New Taipei (TW)

(72) Inventor: I-Thun Lin, New Tapei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 77 days.

(21) Appl. No.: 13/740,149

(22) Filed: Jan. 11, 2013

(65) Prior Publication Data

US 2014/0119697 A1    May 1, 2014

(30) Foreign Application Priority Data

Oct. 29, 2012   (TW) .............................. 101139873 A

(51) Int. Cl.
*G02B 6/42*    (2006.01)

(52) U.S. Cl.
CPC .............. *G02B 6/428* (2013.01); *G02B 6/4293* (2013.01); *G02B 6/4204* (2013.01); *G02B 6/4292* (2013.01); *G02B 6/4246* (2013.01); *G02B 6/4201* (2013.01); *G02B 6/42* (2013.01); *G02B 6/4249* (2013.01)
USPC .................................. 385/93; 385/14; 385/15

(58) Field of Classification Search
CPC ...... G02B 6/42; G02B 6/4201; G02B 6/4246; G02B 6/4293; G02B 6/4292
USPC ..................... 385/14–15.37, 93; 398/135–139
See application file for complete search history.

(56) References Cited

U.S. PATENT DOCUMENTS

| | | | |
|---|---|---|---|
| 4,808,115 A * | 2/1989 | Norton et al. .................... 439/79 |
| 6,403,948 B1 * | 6/2002 | Tachigori ................. 250/227.11 |
| 6,456,766 B1 * | 9/2002 | Shaw et al. ...................... 385/47 |
| 6,635,866 B2 * | 10/2003 | Chan et al. ..................... 250/239 |
| 7,040,814 B2 * | 5/2006 | Morimoto et al. ............... 385/88 |
| 7,490,993 B2 * | 2/2009 | Pitwon ............................. 385/53 |
| 2003/0099444 A1 * | 5/2003 | Kim et al. ........................ 385/88 |
| 2006/0008214 A1 * | 1/2006 | Giboney et al. ................. 385/92 |
| 2008/0142882 A1 * | 6/2008 | Tang et al. ..................... 257/330 |
| 2010/0142882 A1 * | 6/2010 | Heinemann et al. ............ 385/14 |
| 2012/0229998 A1 * | 9/2012 | Kagaya .......................... 361/777 |

* cited by examiner

*Primary Examiner* — Ryan Lepisto
*Assistant Examiner* — Guy Anderson
(74) *Attorney, Agent, or Firm* — Novak Druce Connolly Bove + Quigg LLP

(57) ABSTRACT

An optical connector includes a first printed circuit board (PCB), a second PCB and an optical-electric coupling element. The first PCB includes a supporting surface. The second PCB includes a first surface. The second PCB is positioned on the supporting surface and electrically connected to the first PCB, with the first surface being perpendicular to the supporting surface. The second PCB further includes at least one laser diode and at least one photo diode. The at least one laser diode and the at least one photo diode are positioned on the first surface. The optical-electric coupling element is positioned on the first surface and receives the at least one laser diode and the at least one photo diode. The optical-electric coupling element includes at least two coupling lenses. Each of the at least two coupling lenses aligns with a laser diode or a photo diode.

13 Claims, 4 Drawing Sheets

OPTICAL CONNECTOR HAVING TWO PRINTED CIRCUIT BOARDS

BACKGROUND

1. Technical Field

The present disclosure relates to optical connectors, and particularly to an optical connector which has two printed circuit boards.

2. Description of Related Art

Optical connectors typically include a photoelectric conversion chip, such as a laser diode or a photo diode, and an optical fiber. The photoelectric conversion chip emits and receives light carrying data to and from the optical fiber for data transmission. In certain circumstances, the light path between the photoelectric conversion chip and the optical fiber must be bent about 90 degrees to reduce a length or height of the optical connector. This may be achieved by a reflective mirror tilted at 45 degrees with respect to the photoelectric conversion chip and the optical fiber. However, the essential step of accurately aligning the reflective mirror with the photoelectric conversion chip is a complex and difficult process.

Therefore, it is desirable to provide an optical connector which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
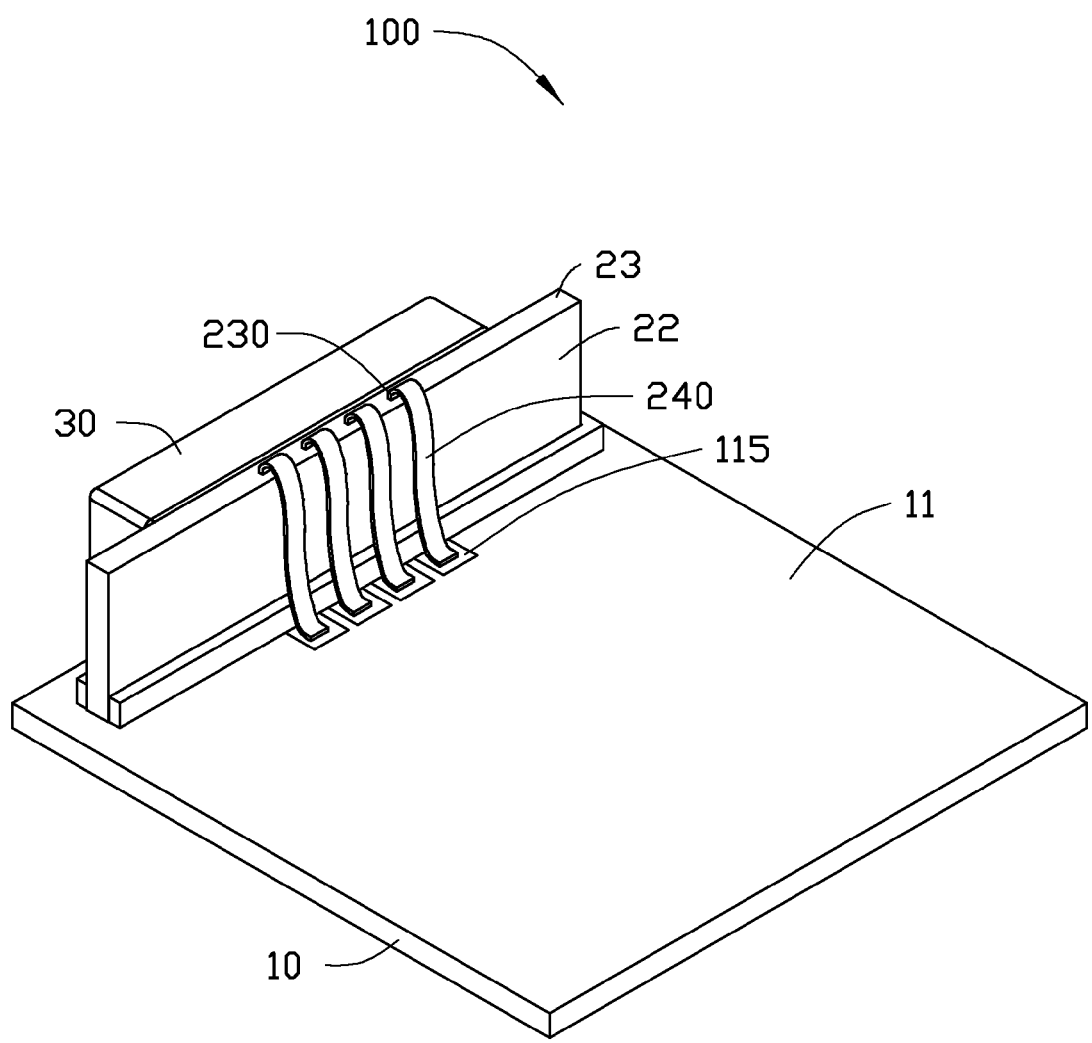
FIG. 1 is an assembled, isometric view of an optical connector, according to an exemplary embodiment.
Figure 2:
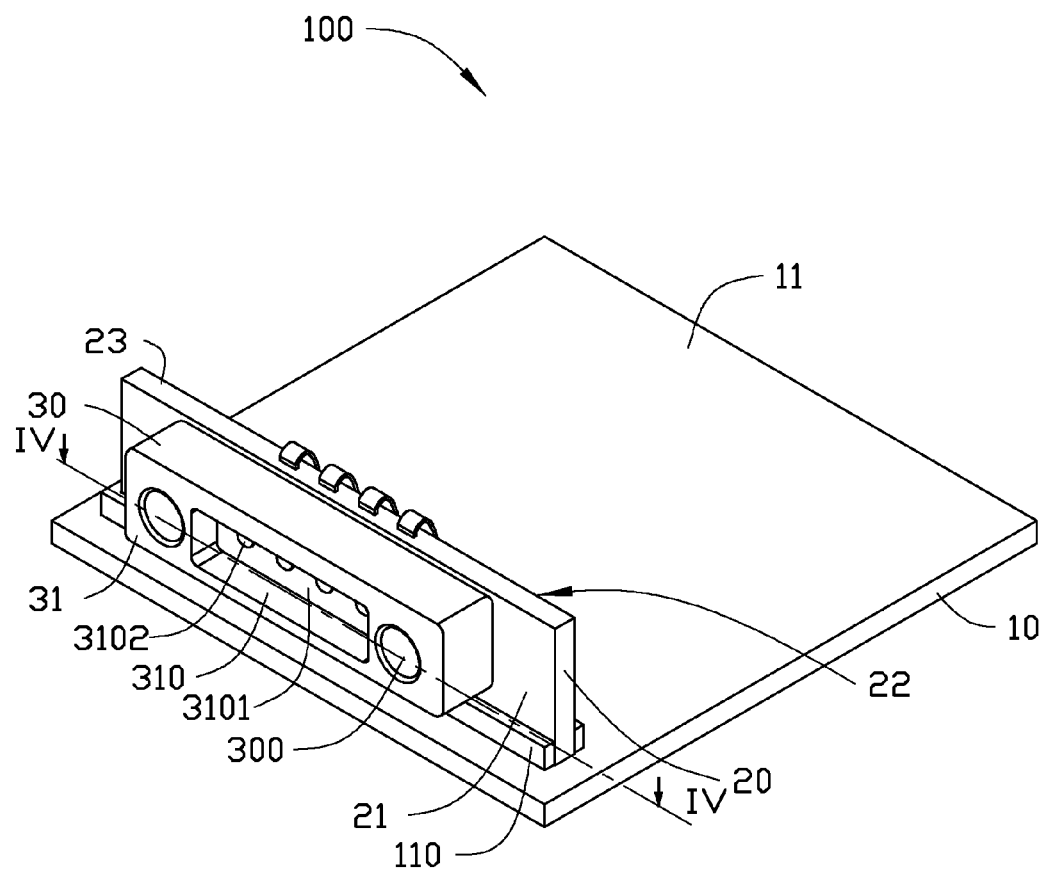
FIG. 2 is similar to FIG. 1, but viewed from another angle.
Figure 3:
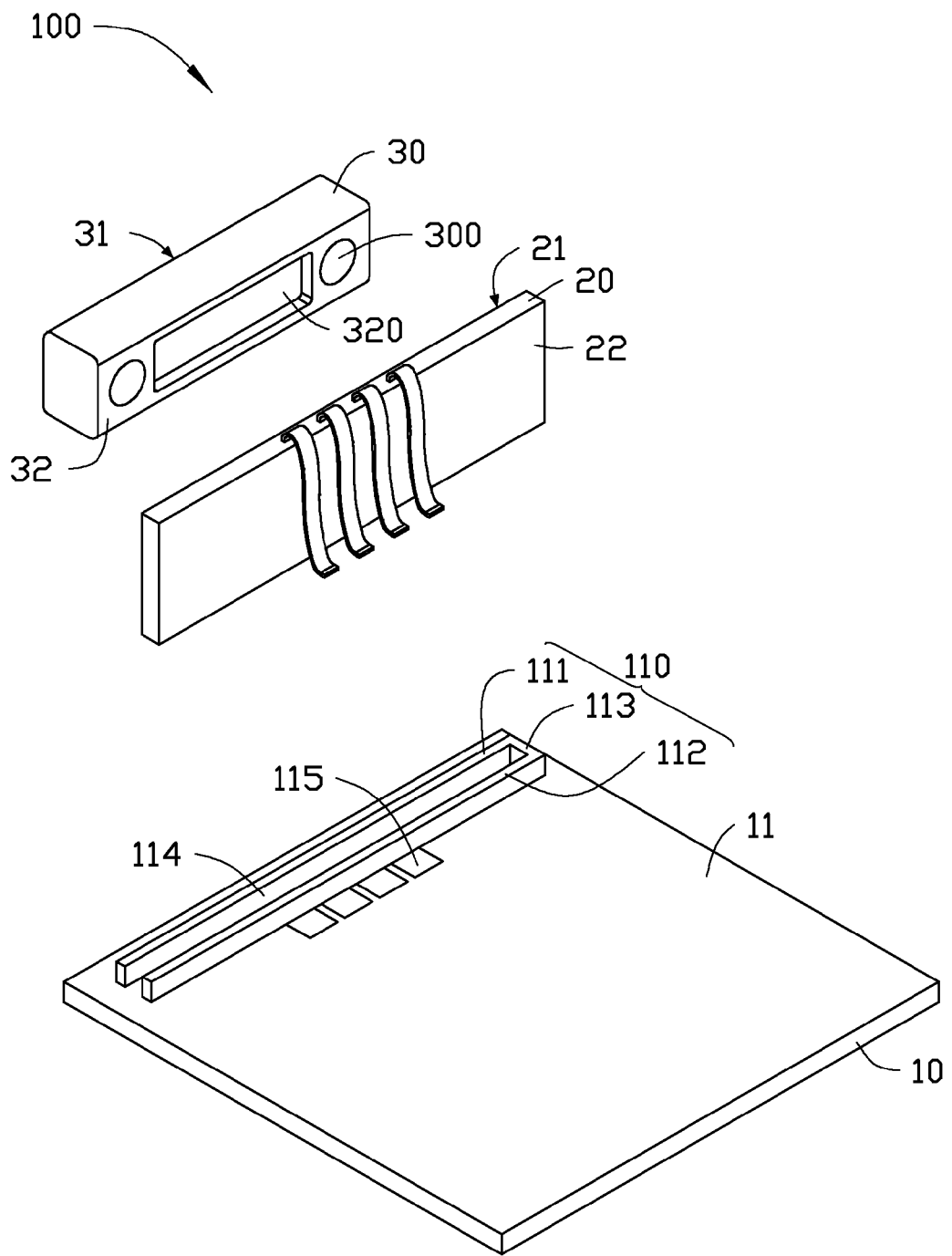
FIG. 3 is an exploded, isometric view of the optical connector of FIG. 1.
Figure 4:
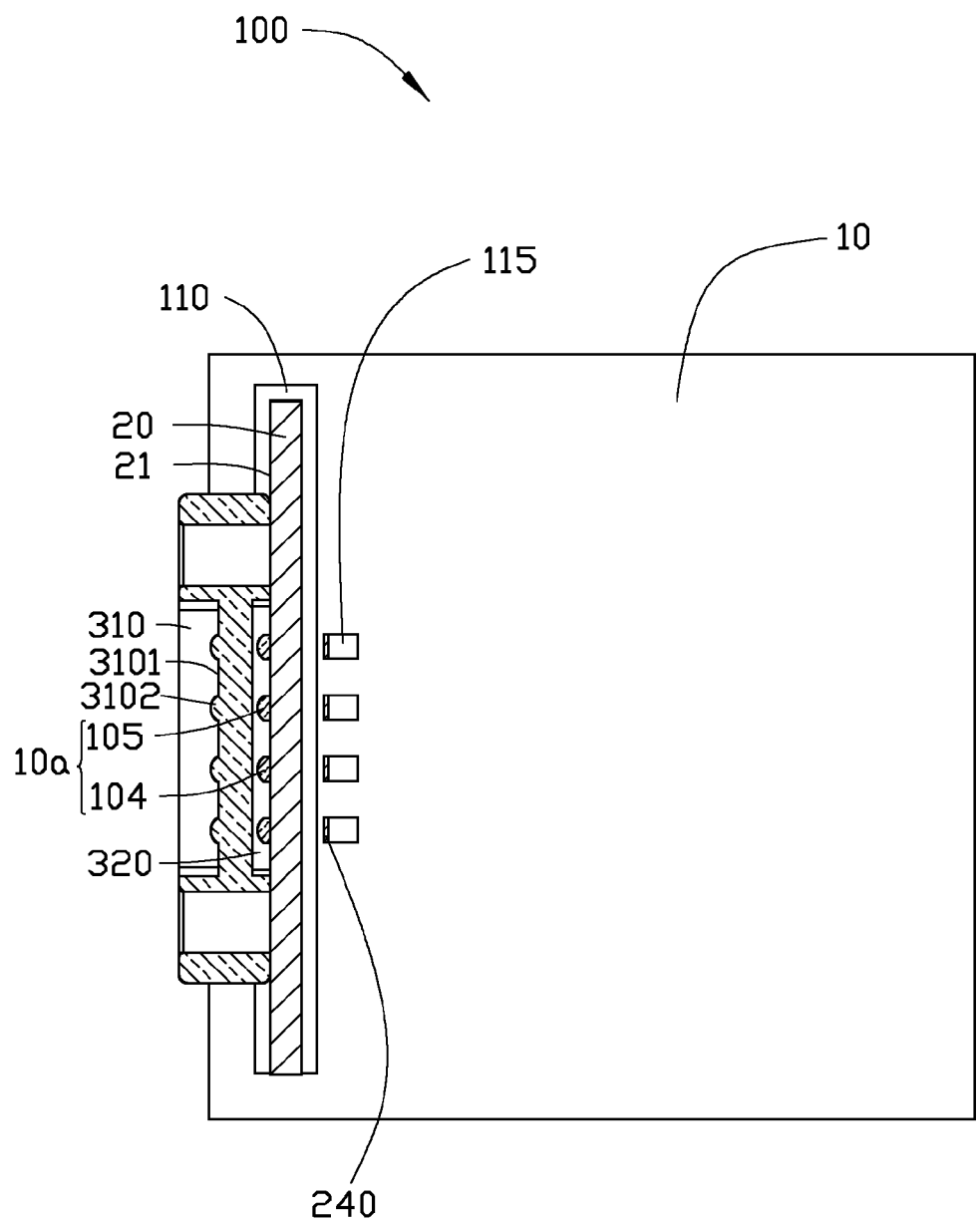
FIG. 4 is a cross-sectional view taken along line IV-IV of FIG. 2.

FIGS. 1-4 show an optical connector 100, according to an embodiment. The optical connector 100 includes a first printed circuit board (PCB) 10, a second PCB 20 and an optical-electric coupling element 30.

The first PCB 10 includes a supporting surface 11. A fixing member 110 is positioned on the supporting surface 11. In the embodiment, the fixing member 110 has the appearance of a hollow rectangle with one open end, and includes a first flange 111, a second flange 112 opposite to the first flange 111, and a third flange 113 connecting the first flange 111 with the second flange 112. The first flange 111 is substantially parallel with the second flange 112. The third flange 113 perpendicularly connects to the first flange 111 and the second flange 112. The supporting surface 11, the first flange 111, the second flange 112 and the third flange 113 cooperatively form a receiving cavity 114. In the embodiment, the first PCB 10 also includes four substrate pads 115.

The second PCB 20 is perpendicularly connected to the supporting surface 11. In particular, a thickness of the second PCB 20 is equal to a distance between the first flange 111 and the second flange 112, thus the second PCB 20 is firmly attached to the supporting surface 11 because the second PCB 20 is clamped tightly in the receiving cavity 114. Alternatively, the second PCB 20 can be attached to the supporting surface 11 by adhesive, or by plastic welding, or other attaching method.

The second PCB 20 includes a first surface 21, a second surface 22 facing away from the first surface 21, and a connection surface 23. Both the first and second surfaces 21 and 22 are perpendicular to the supporting surface 11. The connection surface 23 perpendicularly connects to the first surface 21 and the second surface 22. A photoelectric conversion module 10a is positioned on the first surface 21 and electrically connected to the second PCB 20. The photoelectric conversion module 10a includes four photoelectric conversion chips, such as two laser diodes 104 and two photo diodes 105. The second PCB 20 contains various circuits (not shown) that connect with the photo electric conversion module 10a, to drive the laser diodes 104 to emit light, and for the demodulation of data in the light received by the photo diodes 105. The connection surface 23 defines four guiding holes 230.

The optical connector 100 also includes four connection lines 240. One end of each connection line 240 runs through a respective one of the guiding holes 230 and is electrically connected to a laser diode 104 or to a photo diode 105, and the other end of each connection lines 240 is electrically connected to a substrate pad 115. Therefore, the second PCB 20 is electrically connected to the first PCB 10 by the four connection lines 240.

It should be noted that the second PCB 20 can be electrically connected to the first PCB 10 by a male connector and a female connector. For example, the male connector can be positioned on the second PCB 20 and the female connector can be positioned on the first PCB 10.

The optical-electric coupling element 30 includes a first side surface 31 and a second side surface 32 facing away from the first side surface 31. The first side surface 31 is substantially parallel with the second side surface 32. The optical-electric coupling element 30 defines a first cavity 310 in the first side surface 31 and two locating holes 300 passing through the first side surface 31 and the second side surface 32. In the embodiment, the two locating holes 300 are symmetrical about the first cavity 310.

A bottom portion 3101 of the first cavity 310 forms four coupling lenses 3102. In the embodiment, all of the coupling lenses 3102 are convex lenses and are integrally formed with the optical-electric coupling element 30. The optical-electric coupling element 30 also defines a second cavity 320 in the second side surface 32. The second side surface 32 of the optical-electric coupling element 30 is positioned on the first surface 21 of the second PCB 20, with the two laser diodes 104 and the two photo diodes 105 being received in the second cavity 320 and with each of the coupling lens 3102 aligning with a laser diode 104 or with a photo diode 105. In the embodiment, the optical-electric coupling element 30 is positioned above and substantially parallel with the first PCB 10.

In use, light emitted from the two laser diodes 104 is directed into the optical-electric coupling element 30 by two of the coupling lenses 3102, then directed into the optical fibers (not shown). A process of the photo diodes 105 receiving light is the reverse of that of the laser diodes 104 emitting light.

In other embodiments, the numbers of the laser diodes 104, the photo diodes 105, the substrate pads 115 and the coupling lenses 3102 can be changed depending on need.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
a first printed circuit board (PCB) comprising a supporting surface and at least two substrate pads;
a second PCB comprising a first surface, a second surface, and a connection surface, the first surface and the second surface being perpendicular to the supporting surface, the first surface and the second surface are positioned at opposite sides of the second PCB, the connection surface being interconnected between the first surface and the second surface and being parallel to the supporting surface, the connection surface defining at least two guiding holes, the second PCB positioned on the supporting surface and electrically connected to the first PCB, with the first surface being perpendicular to the supporting surface, the second PCB further comprising at least one laser diode and at least one photo diode, the at least one laser diode and the at least one photo diode positioned on the first surface;
an optical-electric coupling element positioned on the first surface and receiving the at least one laser diode and the at least one photo diode, the optical-electric coupling element comprising at least two coupling lenses, each of the at least two coupling lenses aligning with a respective one of the at least one laser diode and the at least one photo diode; and
at least two connection lines corresponding to the at least two substrate pads and the at least two guiding holes, one end of each connection line running through the corresponding guiding hole and electrically connected to a respective one of the at least one laser diode and the at least one photo diode, and the other end of each connection line electrically connected to the corresponding substrate pad.

2. The optical connector of claim 1, comprising a fixing member positioned on the supporting surface and having open end, wherein the fixing member comprises a first flange, a second flange opposite to the first flange, and a third flange connecting the first flange with the second flange, all of the supporting surface, the first flange, the second flange and the third flange cooperatively form a receiving cavity, and the second PCB is attached on the supporting surface and is clamped in the receiving cavity.

3. The optical connector of claim 2, wherein a thickness of the second PCB is equal to a distance between the first flange and the second flange.

4. The optical connector of claim 2, wherein the first flange is substantially parallel with the second flange, and the third flange perpendicularly connects to the first flange and the second flange.

5. The optical connector of claim 1, wherein the optical-electric coupling element comprises a first side surface and a second side surface facing away from the first side surface, the second side surface is positioned on the first surface, and the optical-electric coupling element defines two locating holes passing through the first side surface and the second side surface.

6. The optical connector of claim 5, wherein the optical-electric coupling element defines a first cavity in the first side surface between the two locating holes, and the at least two coupling lenses all are formed in a bottom portion of the cavity.

7. The optical connector of claim 1, wherein the optical-electric coupling element is positioned above and substantially parallel with the first PCB.

8. The optical connector of claim 6, wherein the optical-electric coupling element defines a second cavity in the second side surface, the second cavity is opposite to and separated from the first cavity, and the at least one laser diode and at least one photo diode are received in the second cavity.

9. The optical connector of claim 8, further comprising a fixing member positioned on the supporting surface and having open end, wherein the fixing member comprises a first flange, a second flange opposite to the first flange, and a third flange connecting the first flange with the second flange, all of the supporting surface, the first flange, the second flange and the third flange cooperatively form a receiving cavity, and the second PCB is attached on the supporting surface and is clamped in the receiving cavity.

10. The optical connector of claim 9, wherein a thickness of the second PCB is equal to a distance between the first flange and the second flange.

11. The optical connector of claim 9, wherein the first flange is substantially parallel with the second flange, and the third flange perpendicularly connects to the first flange and the second flange.

12. The optical connector of claim 8, wherein all of the at least two coupling lenses are convex lenses and are integrally formed with the optical-electric coupling element.

13. The optical connector of claim 8, wherein the two locating holes are symmetrical about the cavity.

* * * * *